United States Patent [19]

Boccuzzi

[11] Patent Number: 5,550,868
[45] Date of Patent: Aug. 27, 1996

[54] π/4-DQPSK DELAY SPREAD DETECTION AND COMPENSATION APPARATUS AND METHOD

[75] Inventor: Joseph Boccuzzi, Brooklyn, N.Y.

[73] Assignee: Lucent Technologies Inc., Murray Hill, N.J.

[21] Appl. No.: 205,060

[22] Filed: Mar. 3, 1994

[51] Int. Cl.$^6$ ..................................................... H03D 3/22
[52] U.S. Cl. ........................... 375/330; 329/318; 455/63; 455/65
[58] Field of Search ................................. 375/76, 58, 40, 375/100, 84, 99, 340; 329/310, 316, 318; 455/52.1, 52.3, 63, 65

[56] References Cited

U.S. PATENT DOCUMENTS

| | | | |
|---|---|---|---|
| 4,035,767 | 7/1977 | Chen et al. | 340/146.1 |
| 4,151,475 | 4/1979 | Von der Neyen | 329/105 |
| 4,878,029 | 10/1989 | Saulnier et al. | 375/102 |
| 5,159,282 | 10/1992 | Serizawa et al. | 329/316 |
| 5,202,643 | 4/1993 | Sato | 375/310 |
| 5,202,901 | 4/1993 | Caemnakoshu | 375/84 |
| 5,214,391 | 5/1993 | Serizawa et al. | 375/14 |
| 5,222,078 | 6/1993 | Cason et al. | 375/76 |
| 5,230,077 | 7/1993 | Raith | 455/65 |
| 5,263,052 | 11/1993 | Borth et al. | 375/39 |
| 5,283,531 | 2/1994 | Serizawa et al. | 375/232 |
| 5,283,815 | 2/1994 | Chennakeshu et al. | 375/84 |

OTHER PUBLICATIONS

Byong Jin Cho, Hong Zhou, Susumu Yoshida, Tsutomu Takeuchi and Dae Young Kim "A Simple Multipath Delay Time Detection Method for π/4 Shift QPSK In Digital Mobile/Portable Communications" 41st IEEE Vehicular Technology Conference, St. Louis, MO, USA. May 19–22, 1991, pp. 7–12, 1991.

Susumu Yoshida, Atsuo Hirai, Guan Leng Tan, Hong Zhou and Tsutomu Takeuchi, "In–Service Monitoring Of Multipath Delay–Spread and C/I For QPSK Signal" Department of Electronics, Faculty of Engineering, Kyoto, University, Kyoto 606–01, Japan, IEEE, Feb. 1992 pp. 592–595.

Primary Examiner—Stephen Chin
Assistant Examiner—T. Ghebretinsae
Attorney, Agent, or Firm—Samuel R. Williamson

[57] ABSTRACT

A π/4 delay spread detection and compensation arrangement effectively detects distortion due to multipath delay spread in a digital channel and compensates for this distortion with minimum circuit complexity. An improvement in the bit error rate performance for a differential detector in the receiver is achieved through use of a detected direct current (DC) component, which is proportional to the amount of multipath delay spread on the digital channel. This DC component is used in the differential detector for compensating for this delay spread. In addition, the differential detector also provides a channel quality measure of the level of delay spread on the digital channel for use by the receiver in selecting either the differential detector or an equalizer for decoding of the data on the digital channel. When the level of delay spread is low, a processor used by the equalizer is freed for other computational tasks or, when the bit error rate permits, is not used at all thereby realizing a reduction in power consumption in the receiver.

14 Claims, 4 Drawing Sheets

BER IN DELAY SPREAD CHANNEL

STATIC CHANNEL DELAY SPREAD INDICATOR
(TWO RAY CHANNEL MODEL)

π/4-DQPSK DELAY SPREAD DETECTION AND COMPENSATION APPARATUS AND METHOD

BACKGROUND OF THE INVENTION

1. Technical Field

The invention relates to digital mobile telecommunications and, more particularly, to signal receiving circuitry which improves the bit error rate performance in the presence of interference phenomena.

2. Description of the Prior Art

As demand grows for greater capacity in wireless communication systems, the telecommunications industry is looking into different approaches that will make the limited radio frequency (RF) spectrum currently allocated to cellular systems more efficient.

One possible solution to the demand for greater capacity is the digital systems presently being considered to replace or supplement the existing North American cellular system which is an analog system. Also known as advanced mobile phone service or AMPS, the North American cellular system has been standardized in a number of Telecommunications Industry Association (TIA) standards, e.g., TR-45.1, and is based upon analog frequency modulation (FM) technology. This cellular system, however, has the limitation of carrying only one voice signal per cellular radio channel.

Typically, in digital wireless communications systems, bandwidth efficient modulation techniques are used to maximize the amount of information transmitted in the form of digital voice and data channels. These systems do so by reducing the spectral bandwidth required for the transmission of each assigned channel in the radio frequency spectrum.

One digital cellular system is based upon time division multiple access (TDMA) techniques and is defined in TIA interim standard (IS)-54. In this system, typically 3 to 6 users (data channels) share a common 30 KHz channel. Each user transmits data in an assigned time slot that is a part of a larger frame. The gross bit rate of the data to be transmitted over the mobile channel is typically 48.6 kilobits per second (kbps). The modulation method is π/4 shifted, differentially encoded, quadrature phase shift keying (DQPSK).

The combination of digital modulation, error-correcting codes, and time-slot interleaving provided by the π/4 DQPSK technique reduces the effects of the most common radio propagation impairments. This, in turn, makes the limited RF spectrum currently allocated to cellular systems more efficient, increases subscriber capacity, and triples the voice channel capacity without requiring additional RF-spectrum.

The wireless channel, however, consists of a number of interference phenomena including multipath delay time dispersion or fading, additive white gaussian noise (AWGN), co-channel interference and frequency selective fading. The multipath delay time dispersion in digital communications, for example, causes intersymbol interference and also crosstalk between in-phase and quadrature-phase signals. This interference phenomena causes imperfections on the wireless channel and thus limits the maximum usable transmission rate.

When the multipath delay time dispersion is present at a significant level, the bit error rate performance of a receiver in the system is considerably degraded. The multipath delay time dispersion is characterized by a quality known as delay spread. And delay spread, in turn, is the time interval between the first arriving signal and last significant echo. It is known in the prior art to detect delay spread, as well as co-channel interference. For example, in an article entitled *"In-Service Monitoring of Multipath Delay-Spread and C/I for QPSK Signal"*, published in Proc. IEEE Vehicular Technology Society Conference (VTC) 1992, pages 592–595, S. Yoshida et al. show that the amount of delay spread and also co-channel interference on a channel may be detected by monitoring the value of the in-phase channel and quadrature channel detector outputs. Similarly, in an article entitled *A Simple Multipath Delay Time Detection Method for π/4 Shift QPSK in Digital Mobile/Portable Communications*, published in 41st IEEE Vehicular Technology Conference, May 1991, pages 7–12, B. J. Cho et al. describes an in-service method of measuring multipath delay spread which is applicable to a π/4 shift QPSK signal. In Cho's method, a frequency doubling technique is employed that moves all the phase states onto the quadrature channel and monitors the in-phase channel for any distortion. The circuitry or processing required for implementing the method of Cho appears to be rather complex to implement, however. Also, neither Yoshida et al. nor Cho et al. provides compensation for multipath delay spread in their respectively described schemes.

It is therefore desirable for a receiver in a digital wireless system to not only be able to detect distortion due to multipath delay spread, but also be able to compensate for this distortion in order to improve the bit error rate performance of such receiver.

SUMMARY OF THE INVENTION

In accordance with the invention, a π/4 delay spread detection and compensation arrangement effectively detects distortion due to multipath delay spread on a digital channel and compensates for this distortion with minimum circuit complexity.

In according with a first aspect of the disclosed embodiment of the invention, a measured direct current (DC) component signal, which is proportional to the amount of multipath delay spread on the digital channel, is used in compensating for the delay spread in a differential detector in the receiver. With such compensation, an improvement in the bit error rate performance for the differential detector is achieved.

In according with a second aspect of the disclosed embodiment of the invention, the differential detector provides a channel quality measure of the level of delay spread on the digital channel. This channel quality measure is used in selecting either the differential detector or an equalizer for detecting the data on the digital channel. When the level of delay spread is low, a processor used by the equalizer is freed for other computational tasks or, when the bit error rate permits, is not used at all, thereby realizing a reduction in power consumption in the receiver.

BRIEF DESCRIPTION OF THE DRAWINGS

This invention and its mode of operation will be more clearly understood from the following detailed description when read with the appended drawing in which.

DETAILED DESCRIPTION

Figure 1:
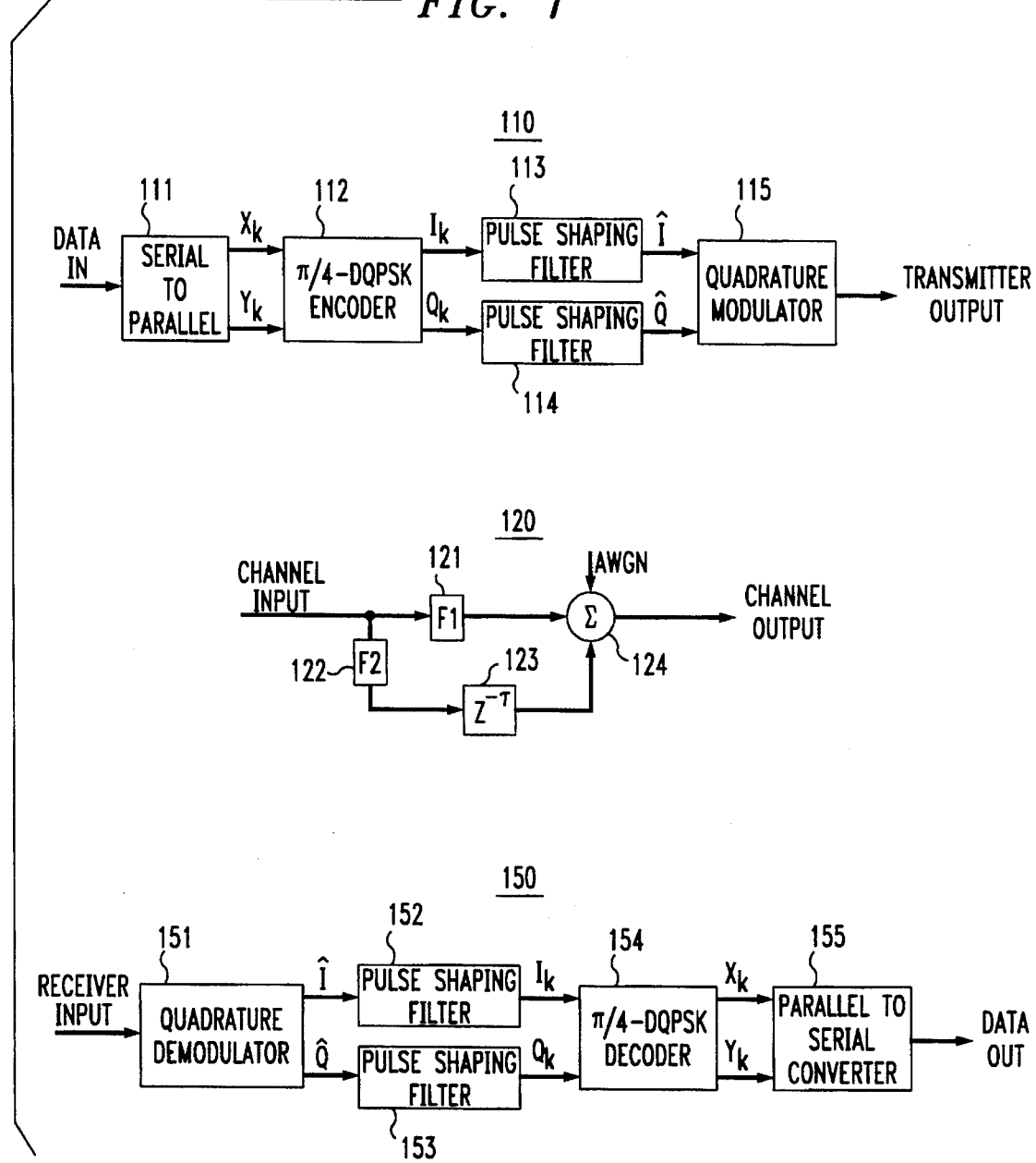
FIG. 1 is a model of a typical π/4 differential quadrature phase-shift keying communications system and includes a transmitter section, an idealized. multipath frequency selective channel model and a receiver in which the principles of the invention may be practiced.

Referring now to FIG. 1, there is shown a model of a typical π/4 differential quadrature phase-shift keying communications system. The system includes a transmitter section 110, an idealized multipath frequency selective channel model 120 and a receiver 150.

Input voice or digital data into the transmitter 110 is provided to a serial-to-parallel converter circuit 111 in which the even and odd bits are separated. The odd bits from the converter circuit 111 are placed on the $X_k$ channel and the even bits are placed on the $Y_k$ channel. Both the odd and even bits, respectively via the $X_K$ channel and the $Y_k$ channel, are coupled to a π/4 differential quadrature phase-shift keying encoder where the carrier is phase shifted according to the input data, producing modulated symbols, $I_k$ and $Q_k$. The conventional process performed in encoder 112 is described in detail in the IS-54 digital cellular standard and is, therefore, not further described herein.

From the encoder 112, the modulated symbols, $I_k$ and $Q_k$ are coupled to pulse-shaping filters 113 and 114 for generating band-limited, quadrature component signals Î and Q̂. These filters may be square root raised cosine transmit pulse filters and are described in the IS-54 standard and also described in IEEE TRANSACTIONS ON VEHICULAR TECHNOLOGY in an article by K. Feher entitled *MODEMS FOR EMERGING DIGITAL CELLULAR-MOBILE RADIO SYSTEM*, Vol.40, No 2, May 1991, pages 335–365. From the filters 113 and 114, the band-limited, quadrature component signals Î and Q̂ are provided to a quadrature modulator 115 where these quadrature component signals Î and Q̂ are modulated and coupled onto an RF carrier for transmission at a predetermined frequency.

Under ideal conditions, a digital signal transmitted from the transmitter 110 would reach a receiver such as receiver 150 without any fading or degradation. However, because of obstructions that may materialize in the path of the signal, either while the transmitter is stationary or in motion, such as is the case while; in use in an automobile, the signal may become distorted. This distortion to the transmitted signal occurs when this signal is received via more than one propagation path of differing lengths, as caused by the obstructions. Thus multiple images of the signal are generated due to reflections from the obstructions. Unfortunately, one or more of these multiple images of the signal gets received by a receiver which is then required to accurately extract the transmitted information from the distorted signal. This negative effect on the transmitted information is illustrated in the frequency selective channel model 120.

Channel model 120 shows the transmitted signal input with first and second independent Rayleigh fading components respectively illustrated in box 121 as fader 1 and in box 122 as fader 2. This channel model 120 is a standard two-ray multipath model as recommended by the TIA standards committee and may have up to a symbol time delay interval between the two rays. The second Rayleigh fading component is shown as being delayed by the excess delay of the multipath channel and is illustrated in box 123. Although this channel model 120 provides a worst case fading environment, it is not to be considered as totally representative of all delay spread cases. For example, other channel models may include more multipath rays and thereby be more reflective of a particular urban, suburban or bad urban propagation environment. The channel model 120 is suitable, however, for generally illustrating a delay spread profile which requires some type of processing in order to recover the distorted transmitted digital signal.

The Rayleigh fading component illustrated in box 121 and the excess delay obtained at the output of box 123 are summed in a receiving antenna of a receiver, such as the receiver 150, described later herein. At the antenna 124, the faded signals are further degraded by the reception of additive white gaussian noise AWGN. Channel model 120 is embodied in the IS-54 standard.

Referring next to the receiver 150 included in a typical π/4 differential quadrature phase-shift keying communications system, the faded digital signals are first received in an associated antenna (not shown) and are then coupled into a quadrature demodulator 151 in this receiver 150. In the quadrature demodulator 151 the phase modulated carder is demodulated into its quadrature components Î and Q̂. From the quadrature demodulator 151, the signals Î and Q̂ are coupled to pulse-shaping filters 152 and 153 which are typically cosine filters that limit noise bandwidth and also have an impulse response matched to the transmit pulse-shaping filters 113 and 114 in the transmitter 110. From the pulse-shaping filters 152 and 153, the band-limited signals, $I_k$ and $Q_k$ respectively, are coupled to a π/4 differential quadrature phase-shift keying decoder 154. In this decoder 154, both an equalizer and a non-coherent, i.e., differential, detector are employed and selectively accessed for compensating for delay spread on a digital channel. The operation of decoder 154 is described later herein with reference to both the process shown in FIG. 2 and the circuitry shown in FIG. 3.

From the decoder 154, the detected and compensated symbols $X_k$ and $Y_k$ are coupled to a parallel-to-serial converter 155, producing a serial digital, data stream of the received digital information. The data from the parallel-to-serial converter 155 is processed in a conventional manner by being coupled respectively to, for example, error correcting and digital voice decoders (not shown). Finally, from these decoders, the digital data stream is typically converted into an analog form and coupled to, for example, an audio speaker.

Figure 2:
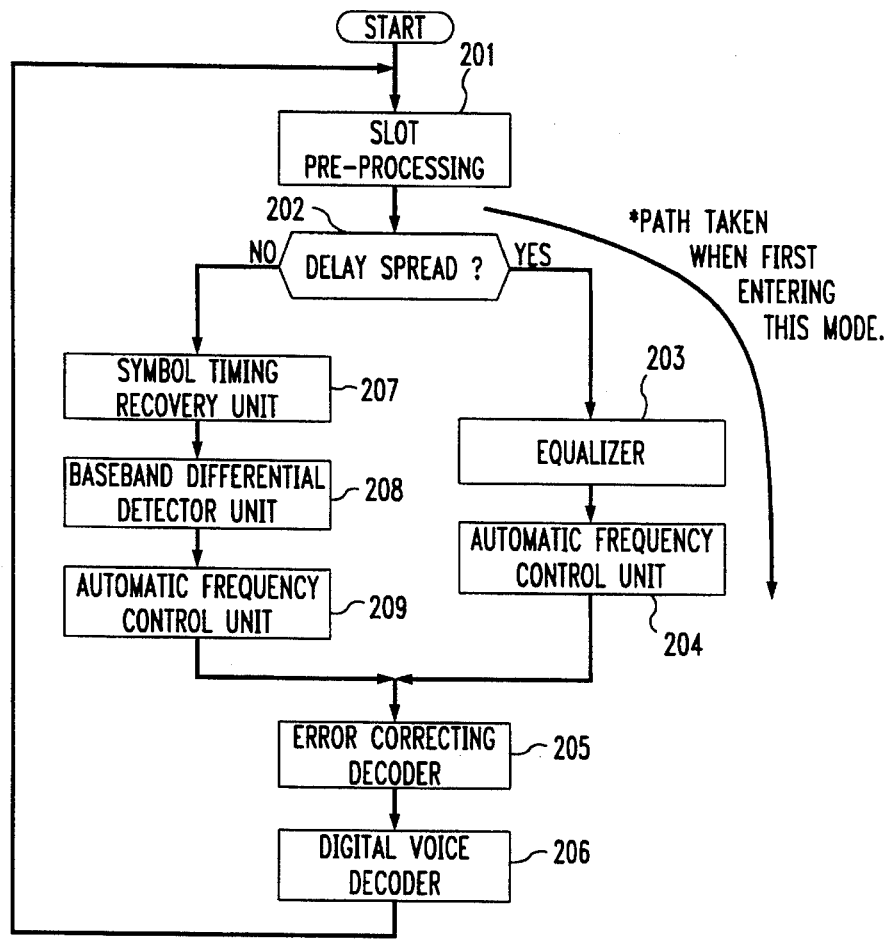
FIG. 2 illustrates in flow chart form the program which implements the principles of the invention in the receiver of FIG. 1.

With reference now to FIG. 2, there is shown a process which illustrates the receiver data flow for two modes automatically selectable by the receiver for receiving and processing digital data. The process is controlled by a suitably programmed and readily available commercial processor (not shown) which is included in the receiver 150.

The process is entered at step 201 where certain processes, such as course adjustments of automatic gain control, automatic frequency control, and delay spread value estimation, are performed. When the process is performed in accordance with the IS-54 standard, certain slot pre-processing occurs since data is transmitted in time-division multiplex slots in the TDMA system defined by this standard. This process is also operable in other than a TDMA system, however. To be operable in other systems such as, for example, other spread spectrum systems and FDMA systems defined by TIA future wireless standards, all that is required is that any appropriate pre-processing for another selected system be performed.

From step 201, the process advances to decision 202. In this decision, the estimated delay spread value is compared to a predetermined threshold $X_t$. This threshold is set at the time of manufacture of the receiver. If the estimated delay spread value is greater than the predetermined threshold, the process enters an equalizer detection processing mode and advances to an equalizer 203. At equalizer 203, time diversity is extracted from the received frequency selective faded signal, thus improving bit error rate (BER) performance. Equalizers are typically employed in digital receivers which are affected by multipath delay spreading.

From the equalizer 203, the process advances to an automatic frequency control unit 204 where frequency offsets in the received signal are minimized. From the control unit 204, the process advances to the error correcting decoder 205. This decoder in the IS-54 standard is typically a Viterbi decoder used to correct random bit errors. Such a decoder is disclosed in U.S. Pat. No. 5,263,052. From the decoder 205, the process advances to a digital voice decoder 206 where the received bits are decoded into, for example, voice samples for further processing in other steps (not shown) by other components in the digital receiver.

Once a time division multiplexed slot has been decoded in the IS-54 standard, the process then returns to step 201 where the next slot is pre-processed for subsequent decoding. From the pre-processing step 201, the process again advances to the decision 202 where the estimated delay spread value is compared to the predetermined threshold value. If the estimated delay spread value is less than the threshold value, then the process enters the differential detection processing mode and advances to the symbol timing recovery unit 207. In this unit, the optimum sample timing instance is estimated. This includes selecting the proper sample to be used for detection and further processing. In the symbol timing recovery unit, the optimum sampling instance, i.e., the maximum "eye opening," of the received signal is selected in order to obtain reliable data. Channel imperfections are frequently evaluated by means of "eye diagrams" or "eye patterns." Such diagrams or patterns and an arrangement for obtaining them are described by Dr. K. Kamilo in *Digital Communications-Satellite/Earth station Engineering*, pages 93–210, Prentice-Hall, 1983.

From the symbol timing recovery unit 207, the process advances to step 208 wherein a base band detector unit such as differential detector 310, described later herein, is accessed. In this step 208, non-coherent detection of the π/4-DQPSK signals is performed. A non-coherent detector is employed as the differential detector rather than a coherent detector because the non-coherent detector is better in fast fading environments. Some forms of differential detectors are described in U.S. Pat. No. 5,151,926 which issued on Sep. 29, 1992.

From step 208, the process advances to an automatic frequency control unit 209 where frequency offsets in the received signal are minimized. From step 209, the process advances once again to the error correcting decoder 205 and on to the digital voice decoder 206. This process continues for the duration of the voice call.

Figure 3:
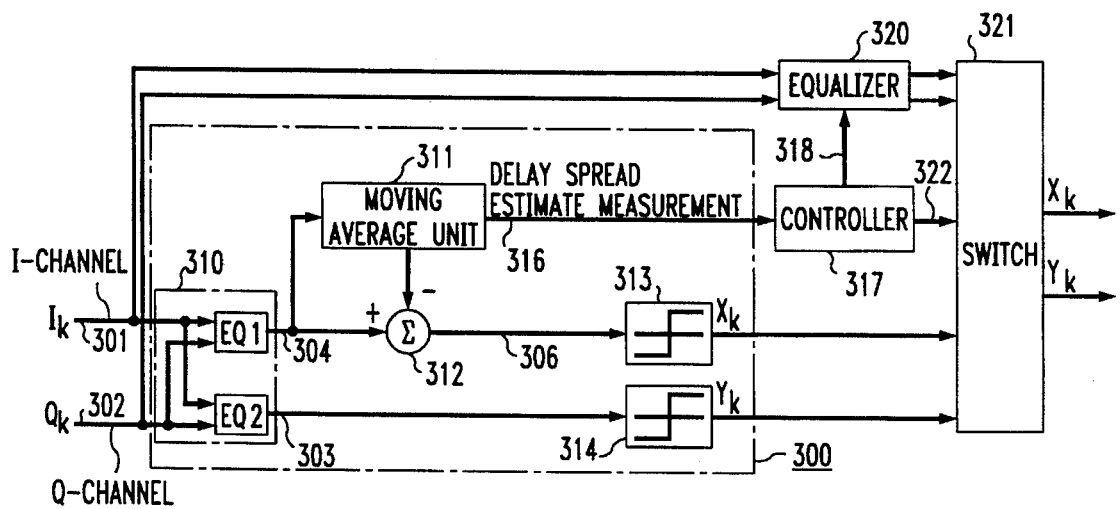
FIG. 3 shows in more detail π/4-DQPSK circuitry for use in the receiver of FIG. 1.

Referring next to FIG. 3, there is shown, in accordance with an embodiment of the invention, improved π4-DQPSK differential detector circuitry 300 suitable for use as the differential detector portion of the decoder 154 shown in FIG. 1. Also shown in FIG. 3 are a controller 317, an equalizer 320 and a selector switch 321 which cooperate to provide an advantageous operation when combined with the differential detector circuitry 300.

This differential detector circuitry 300 may be implemented either in hardware or in a digital signal processor. An input into the differential detector circuitry 300 is provided via a non-coherent, baseband differential detector 310. These inputs are the $I_k$ signal on the I-Channel and the $Q_k$ signal on the Q-Channel. The baseband differential detector 310 produces the received data from differential phase changes in the received carder.

The baseband differential detector 310 also performs an auto-correlation function in the receiver that detects the amount of multipath delay spread present on a channel. Mathematically, the baseband differential detector can be represented as follows:

$$X_k = I_k I_{k-1} + Q_k Q_{k-1} \tag{1}$$

$$Y_k = Q_k I_{k-1} - I_k Q_{k-1} \tag{2}$$

where k=time instant.

Figure 5:
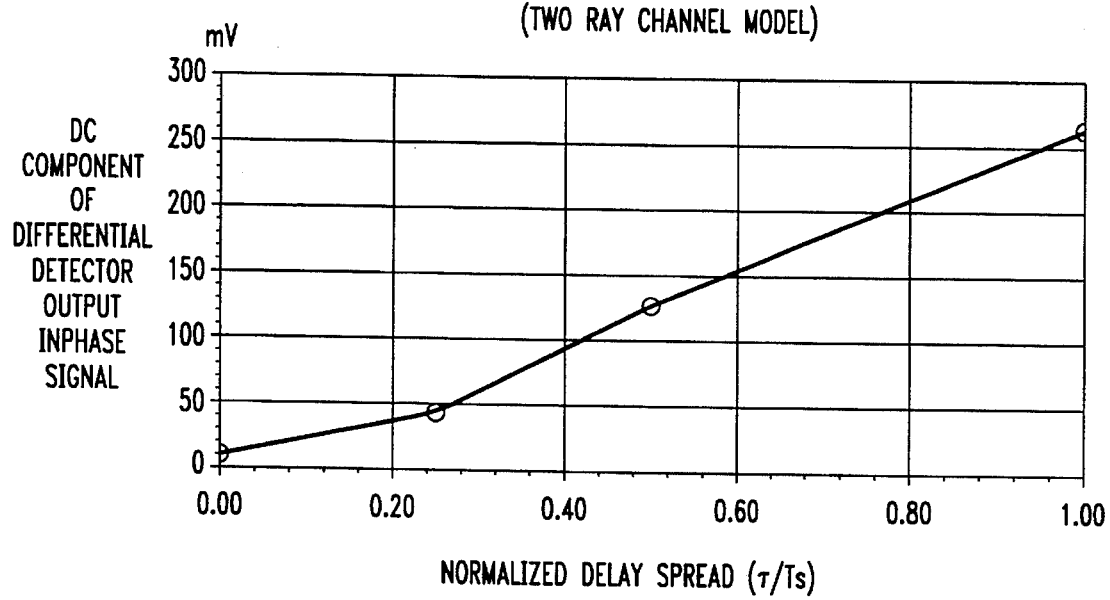
FIG. 5 illustrates a relationship between the multipath delay spread in a digital wireless channel and the DC component signal that may be used in determining a channel quality estimate.

Equations 1 and 2 show the use of the autocorrelation function to obtain the in-phase signal on line 304 and the cross-correlation to obtain the quadrature signal on line 303. As the delay spread increases on the digital channel, equation 1 indicates its presence by computing the sums of the input auto-correlations. This sum takes the form of a DC component signal which is proportional to the amount of delay spread on the digital channel. The value of the DC component signal versus the amount of delay spread on the channel is shown in FIG. 5 for a two ray channel model. From an examination of this figure, a relationship between the delay spread and the DC component signal is shown, this relationship being usable as a channel quality estimate. In a most economical circuit embodiment using this autocorrelation function, even a simple level comparator is able to indicate the presence of delay spread on a digital channel.

Figure 6:
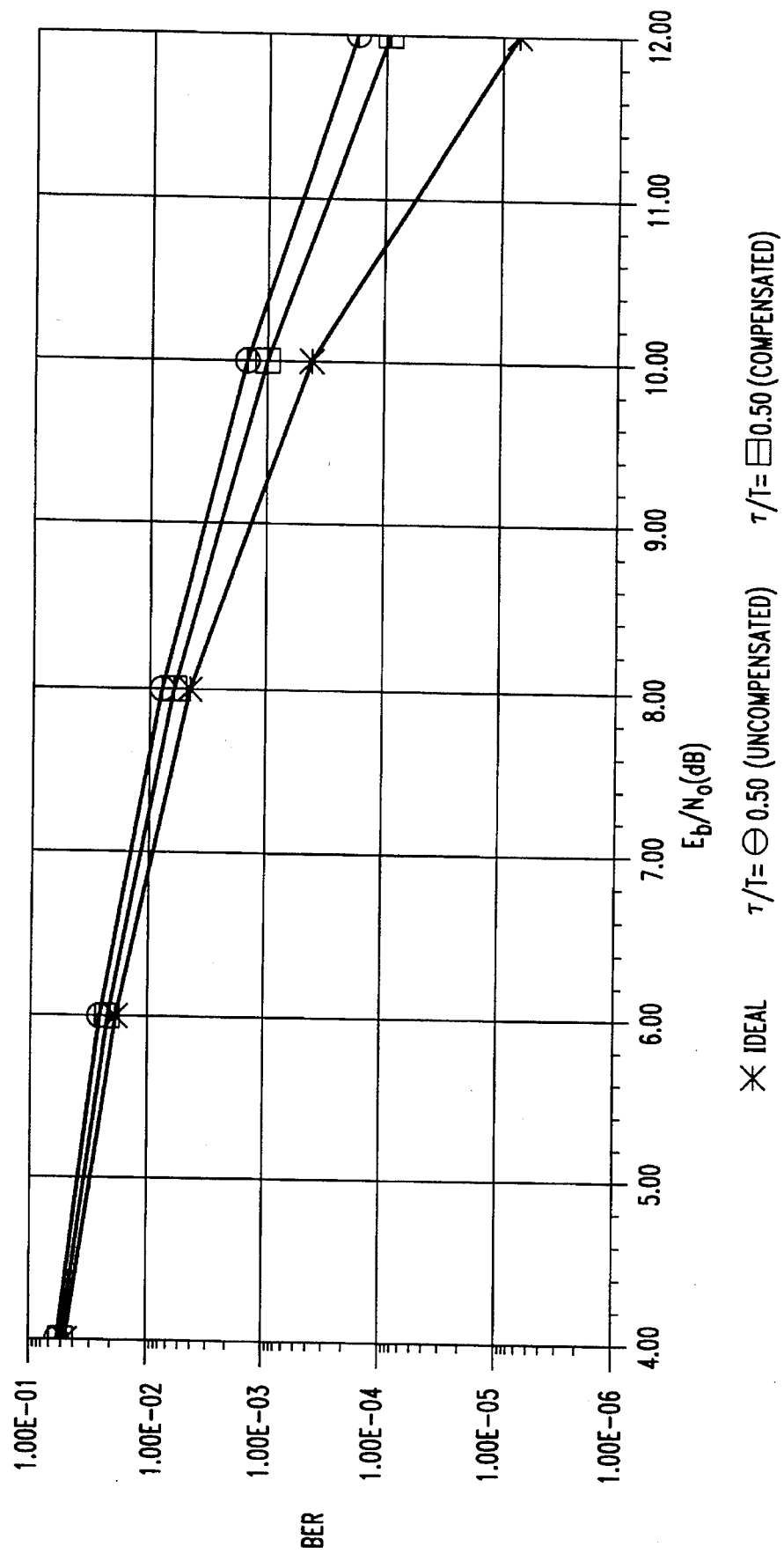
FIG. 6 is an illustration of the bit error rate versus signal-to-noise ratio per bit ($E_b/N_o$) in dB for normalized excess delay spread of 0.50 (τ/T), compensated and uncompensated, in accord with the principles of the invention.

In addition, since it is apparent that the delay spread appears in the form of a DC component signal on the in-phase signal on line 304, it is also desirable to remove this DC component signal in order to improve the BER performance, thus making the detector 310 more robust in delay spread environments. When the circuitry of FIG. 3 is employed in the receiver 150 of FIG. 1, an improvement in the BER vs. Bit Energy per Noise Spectral Density ($E_b/N_o$) in dB is provided as shown in the graph of FIG. 6. In this graph, the ideal performance is shown along with the bit error rate curve for normalized excess delay spread of 0.50 (τ/T), compensated and uncompensated. These curves show the BER performance improvement when using the compensation arrangement described in FIG. 3. The BER performance improvement is, for example, approximately 0.5 dB at BER=1.00E-03.

Referring once again to FIG. 3, The quadrature output signal of detector 310 on line 303 is coupled to a threshold device 314, producing either a 1 or a −1 output $Y_k$. The in-phase output signal of detector 310 on line 304 is coupled to both a moving average unit 311 and to a subtracter 312. The moving average unit 311 estimates the DC component of the signal. This estimated DC component is then subtracted from the signal on line 304 in the subtracter 312.

The DC compensated in-phase signal on line 306 of FIG. 3 is coupled to a threshold device 313, producing a 1 or a −1 output $X_k$. The output of this threshold device 313 along with the output of the threshold device 314 are coupled into a parallel-to-serial converter, such as the converter 155 shown in FIG. 1.

The estimated DC offset in the moving average unit 311 may be obtained in either of two ways—from a moving average filter or a running average filter.

In the moving average filter, the final average value is estimated by sliding a window across the received time slot while measuring the average value in the window. In a running average filter, the average value is estimated using the entire received time slot data. Moving average units suitable for use as moving average unit 311 are known and are described in *Digital Signal Process Principles, Algorithms, and Applications*, by J. G. Proakis et al., 2nd edition, 1992, pages 102–108.

From the moving average unit 311, the delay spread estimate measurement is provided to controller 317. If the delay spread estimate is greater than the predetermined threshold, the equalizer 320 is activated by a signal from controller 317 over the control line 318 and the selector switch 321 is also configured to pass the signal from the equalizer 320 to a parallel-to serial converter, such as converter 155 shown in FIG. 1. If the delay spread estimate is less than the predetermined threshold, the equalizer is not activated and the signal from detector 310 is coupled through switch 321.

An equalizer suitable for use as equalizer 320 is disclosed in U.S. patent application Ser. No. 08/035,860 filed on Mar. 23, 1993. Another equalizer is disclosed in U.S. Pat. No. 5,263,052 which issued on Nov. 16, 1993. A general discussion of equalizers is provided in an article entitled *A comparison of Nonlinear Equalization Methods for the U.S. Digital Cellular System*, by K. L. Baum et al., IEEE-ICC, 1992, pages 291–295.

Figure 4:
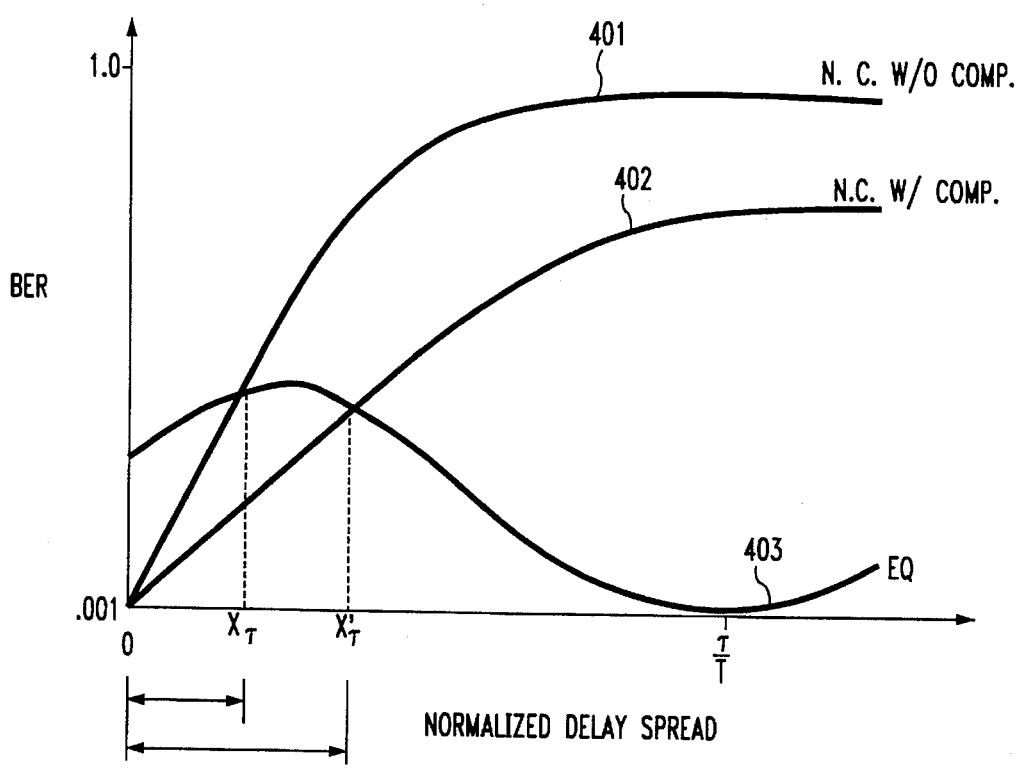
FIG. 4 provides a graphical illustration of an improvement in performance obtainable by employing a compensation arrangement achieved in accordance with an embodiment of the present invention.

Referring now to FIG. 4, there is shown a graphical illustration of the differential detector bit error rate in the delay spread channel and the improvement obtainable by employing in the differential detector the compensation achieved by the embodiment of the present invention. There is also shown, in accordance with an embodiment of the disclosed invention, how the best overall improvement in bit error rate is achieved by employing the differential detector with compensation and an equalizer in combination. The method by which this is accomplished is through a bimodal operating state selection in the receiver which switches in the equalizer when the delay spread value is greater than $X_t$, and for delay spread values less than this threshold, use the differential detector. These relationships are illustrated in FIG. 4 where the bit error rate BER is shown on the axis of ordinates while the normalized delay spread is shown on the axis of abscissas.

When the differential detector is employed without compensation, it may be seen that the bit error rate (BER) increases rapidly with the presence of delay spread in the channel. This is shown by line 40 1. The differential detector that is employed with compensation is shown by line 402. In large delay spreads on a channel, the bit error rate performance is improved by use of the equalizer as illustrated by the line 402 in FIG. 4. As recognized by S. H. Good et al. in IEEE Vehicular Technology Conference, Apr. 1990, pages 687–694, in an article entitled *A Comparison of Limiter-Discriminator, Delay and Coherent Detection for π/4 QPSK*, an equalizer performs better when a certain amount of delay spread exists. Thus the equalizer's performance starts at a BER floor and improves up to a point for increasing delay spreads. The BER floor of a differential detector, both with and without compensation is lower than that of the equalizer for small delay spread.

The differences between the equalizer performance and the non-coherent detector, without compensation and with compensation, are clearly illustrated in FIG. 4. The overall benefit achieved by the embodiment of the present invention is that when compensation is employed, the threshold $X_t$ can be increased as shown to $X_t'$ or advantageously set at such level at the time of manufacturer of the receiver so that the non-coherent detector is used over a greater delay spread. Since the detector is much simpler in circuit complexity, being able to employ this detector over a greater range of delay spread advantageously allows a processor used by the equalizer to be free for other computational tasks in the receiver or, when the bit error rate permits, to not be used at all thereby realizing a reduction of power consumption in the receiver.

Various other modifications of this invention are contemplated and may obviously be resorted to by those skilled in the art without departing from the spirit and scope of the invention. For example, the co-channel interference which may appear in the form of a DC component signal on the quadrature output signal line of detector 310 may be detected in the manner of the DC component signal on the in-phase signal line and similarly used for compensation. Thus it is to be understood that the invention may be practiced in ways other than as hereinafter defined by the appended claims.

I claim:

1. A digital wireless receiver arranged for decoding digital signals on a multipath delay spread digital channel, the receiver comprising:

differential detector circuit means for decoding the digital signals on the channel;

means for detecting a direct current (DC) component signal produced in the differential detector circuit means, the level of said DC component signal being proportional to the amount of multipath delay spread on the digital channel; and compensating means for removing said DC component signal, said compensating means being responsive to the detecting means for providing compensation to the differential detector circuit means for compensating for the multipath delay spread on the channel.

2. The digital wireless receiver as in claim 1 wherein the differential detector circuit means includes a non-coherent detector.

3. The digital wireless receiver as in claim 2 wherein the detecting means comprises a moving average unit for estimating the level of the DC component signal.

4. The digital wireless receiver as in claim 3 wherein the compensating means includes subtracter means for removing the DC component signal from an in-phase output signal provided by the non-coherent detector.

5. A digital wireless receiver arranged for decoding digital signals on a multipath delay spread digital channel, the receiver comprising:

differential detector circuit means for decoding the digital signals on the channel;

equalizer circuit means for decoding the digital signals on the channel;

a moving average unit for detecting a direct current (DC) component signal produced in the differential detector circuit means, the level of said DC component signal being proportional to the amount of multipath delay spread on the digital channel; and means responsive to the moving average unit for selecting either the differential detector circuit means or the equalizer circuit means for decoding the digital signals on the channel, the selecting means selecting the differential detector circuit means when the DC component signal is below a predetermined level and selecting the equalizer circuit means when the DC component signal is above the predetermined level.

6. The digital wireless receiver as in claim 5 wherein the differential detector circuit means includes a non-coherent detector.

7. The digital wireless receiver as in claim 6 wherein the moving average unit includes means for estimating the level of the DC component signal.

8. A method of decoding digital signals in a wireless receiver, the digital signals being received on a multipath delay spread digital channel, the method comprising the steps of:

decoding in a differential detector circuit the digital signals on the channel;

detecting a direct current (DC) component signal generated in the differential detector circuit, the level of said DC component signal being proportional to the amount of multipath delay spread on the digital channel; and providing compensation to the differential detector circuit in response to the detecting step for compensating for the multipath delay spread on the channel.

9. The method of decoding digital signals in a wireless receiver as in claim 8 wherein the differential detector circuit includes a non-coherent detector.

10. The method of decoding digital signals in a wireless receiver as in claim 9 further including a moving average unit for estimating the level of the DC component signal.

11. The method of decoding digital signals in a wireless receiver as in claim 10 further including a subtracter circuit for removing the DC component signal from an in-phase output signal provided by the non-coherent detector.

12. A method of decoding digital signals in a wireless receiver, the digital signals being received on a multipath delay spread digital channel, the method comprising the steps of:

detecting in a moving average unit a direct current (DC) component signal generated in a differential detector circuit, the level of said DC component signal being proportional to the amount of multipath delay spread on the digital channel;

providing both the differential detector circuit and an equalizer circuit for decoding the digital signals on the channel; and selecting responsive to the detecting step the differential detector circuit for decoding the digital signals on the channel when the DC component signal is below a predetermined level and selecting the equalizer circuit for decoding the digital signals on the channel when the DC component signal is above the predetermined level.

13. The method of decoding digital signals in a wireless receiver as in claim 12 wherein the differential detector circuit includes a non-coherent detector.

14. The method of decoding digital signals in a wireless receiver as in claim 13 further including the step of estimating in said moving average unit the level of the DC component signal.

* * * * *